No. 876,508. PATENTED JAN. 14, 1908.
G. B. WEBB.
TYPE WRITING MACHINE.
APPLICATION FILED SEPT. 1, 1903.
5 SHEETS—SHEET 1.
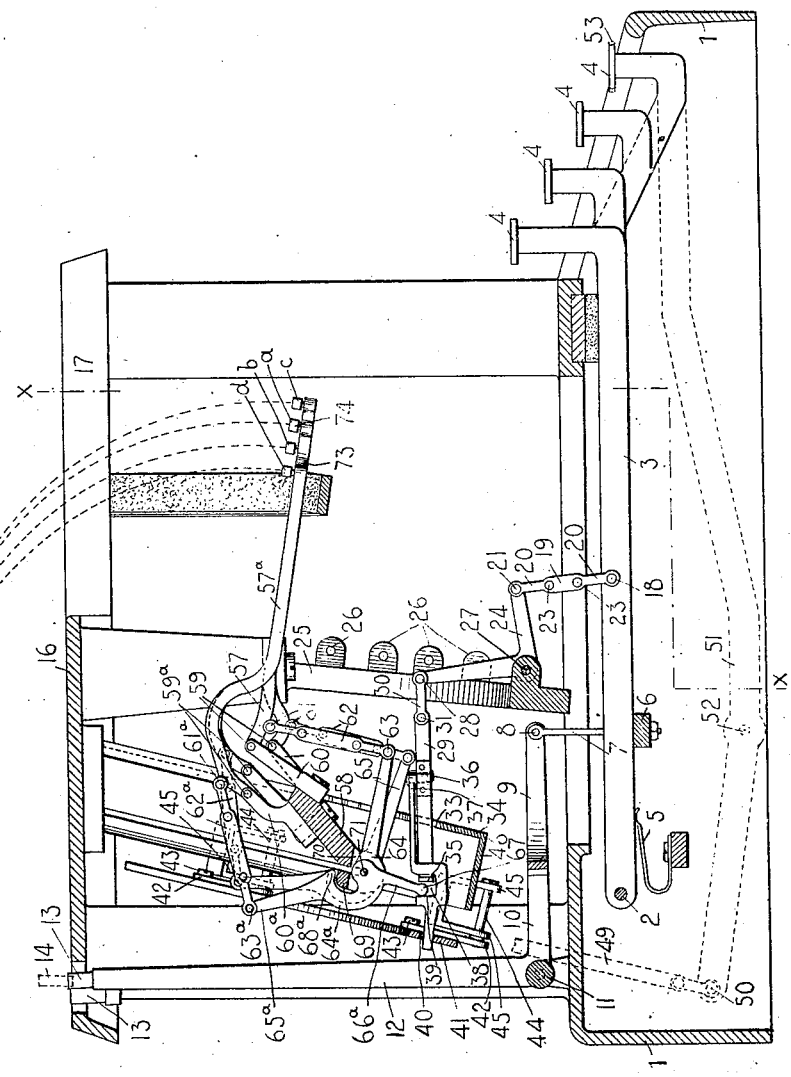
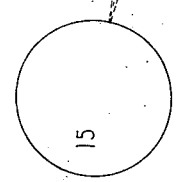
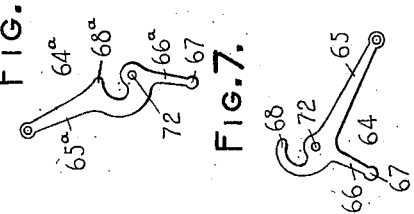
WITNESSES:
K. V. Donovan
Charles E. Smith
INVENTOR:
George B. Webb
by Jacob Felbel
HIS ATTORNEY No. 876,508. PATENTED JAN. 14, 1908.
G. B. WEBB.
TYPE WRITING MACHINE.
APPLICATION FILED SEPT. 1, 1903.

5 SHEETS—SHEET 2.

WITNESSES:

INVENTOR
George B Webb
by Jacob Felbel
His Attorney

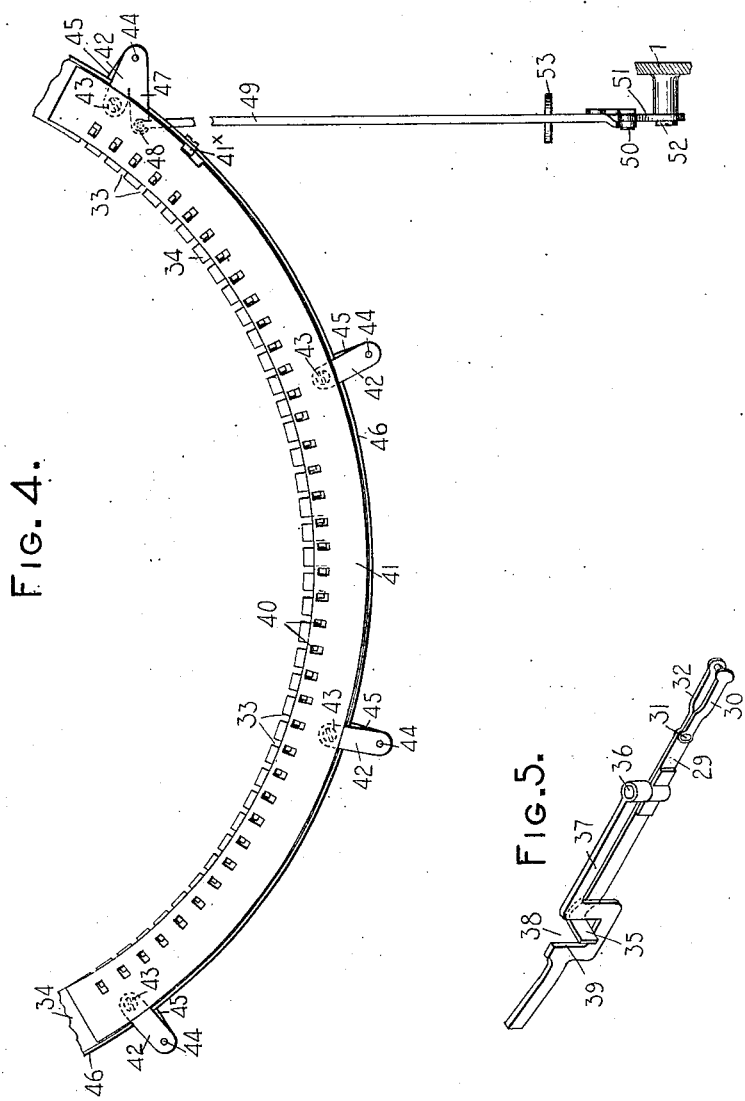

No. 876,508. PATENTED JAN. 14, 1908.
G. B. WEBB.
TYPE WRITING MACHINE.
APPLICATION FILED SEPT. 1, 1903.
5 SHEETS—SHEET 5.
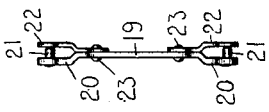
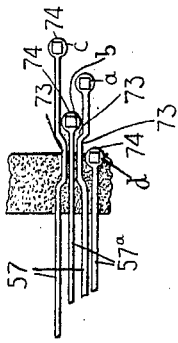
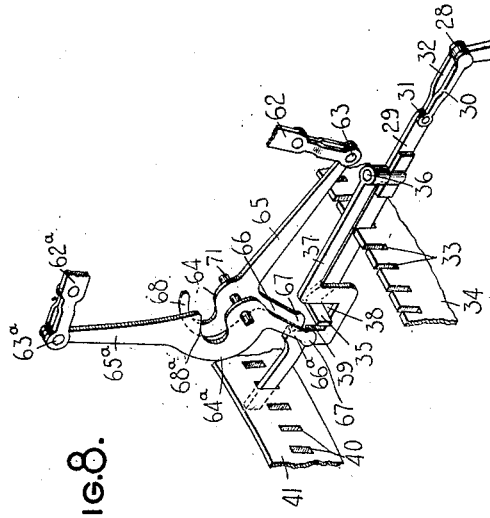
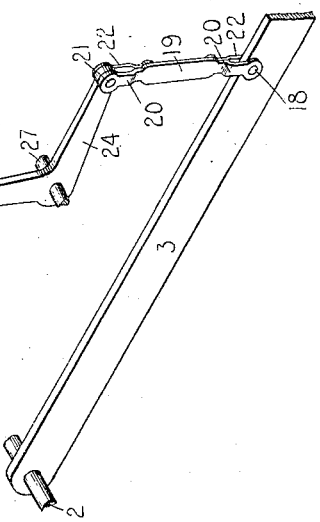
WITNESSES.
INVENTOR
George B Webb.
by
HIS ATTORNEY

UNITED STATES PATENT OFFICE.

GEORGE B. WEBB, OF WESTFIELD, NEW JERSEY, ASSIGNOR TO WYCKOFF, SEAMANS & BENEDICT, OF ILION, NEW YORK, A CORPORATION OF NEW YORK.

TYPE-WRITING MACHINE.

No. 876,508.      Specification of Letters Patent.      Patented Jan. 14, 1908.

Application filed September 1, 1903. Serial No. 171,509.

*To all whom it may concern:*

Be it known that I, GEORGE B. WEBB, citizen of the United States, and resident of Westfield, in the county of Union and State of New Jersey, have invented certain new and useful Improvements in Type-Writing Machines, of which the following is a specification.

The present invention relates to the type actions and "case" shifting mechanism for typewriting machines, and more particularly to that character of machines wherein each finger-key is adapted to actuate any one of a plurality of type carriers, and the main object of the invention is to provide an efficient typewriting machine of the general character specified.

To these and other ends which will hereinafter appear, my invention consists in the novel features of construction, arrangements of parts and combinations of devices to be hereinafter described and particularly pointed out in the appended claims.

Figure 2:
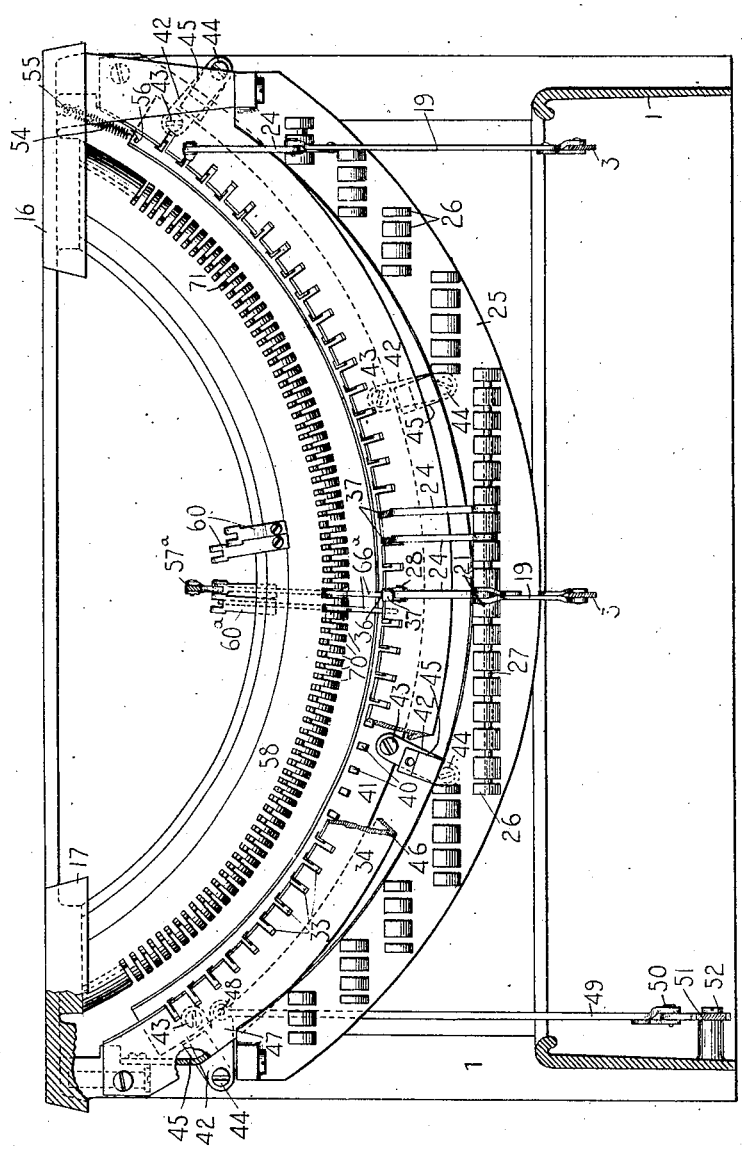
Figure 3:
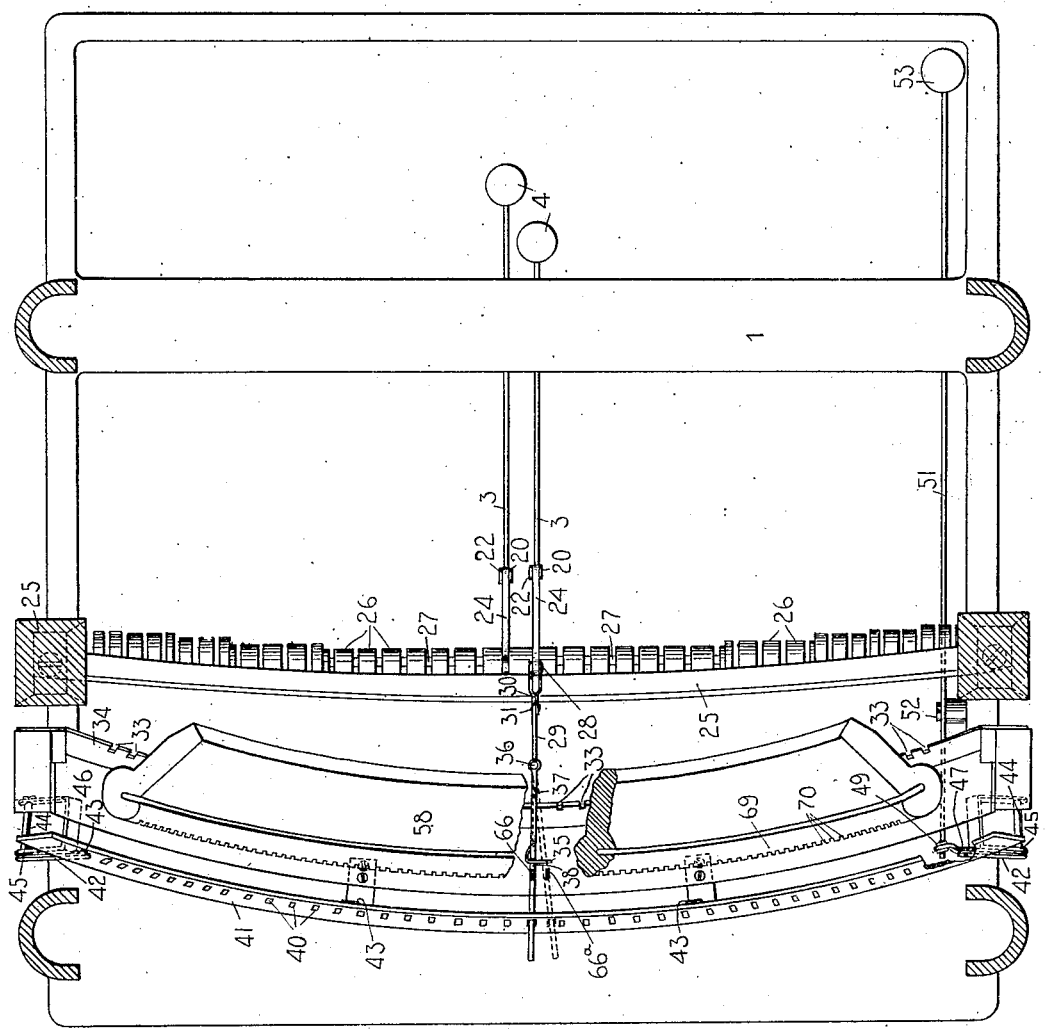

In the accompanying drawings, wherein like reference characters indicate corresponding parts in the various views, Figure 1 is a vertical sectional view of one form of typewriting machines embodying my invention, the section being taken from front to rear of the machine. Fig. 2 is a vertical sectional view of the machine taken from side to side thereof on the line $x$—$x$ of Fig. 1, with some parts omitted and some broken away. Fig. 3 is a horizontal sectional view of the machine, the section being taken beneath the top plate of the machine. Fig. 4 is a detail rear elevation of the shifting segment or guide and the means for actuating it. Fig. 5 is a detail perspective view of one of the type carrier actuating slides and connectors. Fig. 6 is a detail side view of one of the actuating levers to be hereinafter described. Fig. 7 is a like view of another of said actuating levers. Fig. 8 is a fragmentary detail perspective view of one of the key levers and the means for operatively connecting it to any one of a plurality of type carriers. Fig. 9 is a detail edge view of one of the connecting links. Fig. 10 is a fragmentary detail plan view showing the outer ends of four of the type carriers to illustrate the disposition thereof.

In the various views, some parts have been omitted and others broken away to more clearly illustrate the structure.

The present invention is illustrated in its application to a "front strike" typewriting machine, though it should be understood that from certain aspects of the invention the various features thereof may be employed in other characters of typewriting machines.

The frame 1 of the machine has pivoted at 2 therein key levers 3 which are provided with the usual finger keys 4, and each key lever is restored to the normal position by a spring 5. Extending beneath all of the key levers 3 is a universal bar 6, connected at its ends to links 7 that are each pivoted at 8 to a bowed arm 9 which is connected to an arm 10 that projects from the rock shaft 11 of a dog rocker 12 provided with the usual feed dogs 13 that may coöperate with a suitable feed wheel or rack 14, diagrammatically shown in dotted lines in Fig. 1. It will be understood that the feed wheel coöperates with suitable mechanism to produce an intermittent feed movement of a carriage (not shown) and that the platen 15, which is diagrammatically illustrated in Fig. 1, is carried by the carriage. The top plate 16 is open at 17 at the front portion thereof to permit a free movement of the type bars or carriers to the printing point. Each key lever 3 is pivoted at 18 to a draw-link 19 that is shown in detail at Fig. 9 of the drawings. Each of these draw-links 19 preferably consists of a rigid body section which is bent at its ends 20 and has riveted at each end a pin 21 that constitutes a pivot by means of which the link is connected to its associated parts. Coöperating with each pin 21 is a spring plate 22 which is riveted to the body of the link at 23. Each spring plate normally bears against the free end of its coöperating pin 21 so as to maintain the connected parts united to the link. In order to disconnect the link from its associate parts, it is merely necessary to deflect the springs or spring plates 22 to one side and to withdraw the pivot pins from the bearings of the parts to which said link is connected.

As before stated, each of the links 19 is connected at one end 18 to a key lever, whereas the opposite end of each of said links is connected to a bell crank lever 24. The various bell crank levers 24 are mounted in bearings upon a vertically disposed segmental plate 25, as shown in Fig. 2. The bearings 26 for the links are in the nature of apertured studs which project forward from the face of the segment 25 and are spaced apart for the reception of the bell cranks between them. The studs are disposed in step-shape rows and a single pivot wire 27 may be projected through each series of studs or bearings. By this arrangement a more efficient bearing for the bell crank levers is provided than would be the case if all of the bell cranks were mounted upon a single segmental pivot wire, for the reason that straight pivot wires are provided for the bell cranks and there is less friction or tendency to bind between the pivot wires and bearings of the bell cranks than there would be if a curved pivot wire were employed. Notwithstanding the step-shaped arrangement of the various bearings for the bell crank levers, a general segmental arrangement of said levers is provided. The upper end of each bell crank lever 24 is pivoted at 28 to an actuating slide 29 and the forward end of each of these slides is preferably provided with a spring plate 30 which is riveted at one end 31 to the slide and bears at its free end against a pivot pin which is riveted to the bent end 32 of the slide. In other words, the construction of the forward end of each slide corresponds to the construction at one end of each of the links 19 and it enables a ready assembling or dismounting of the parts. Each of the slides 29 is guided in its movement in a slot 33 of a fixed segmental plate 34 and is provided at its rear end with a laterally extending piece or projection 35 (Fig. 8) for purposes which will hereinafter appear. Each slide 29 has pivoted thereto at 36 what I term a connector 37 and this connector is recessed at 38 to form a bearing shoulder 39 and to permit the laterally extending piece 35 of its associated slide to be received therein. The rear or free end of each connector is received within an opening 40 in the segmental guide or shifting plate 41 which is limited in its movement by a stop 41× (see Fig. 4) and is supported upon links 42, each of which is pivoted at one end 43 to the guide, and at its opposite end 44 to depending lugs 45 secured to a segmental flange 46 that preferably constitutes a part of the fixed guide 34, as shown in Fig. 1. One of the links 42 is provided with a laterally extending arm 47 to which is pivoted at 48 a vertically disposed rod 49 and the lower end of this rod 49 is connected at 50 to a key lever 51 that is pivoted at 52 and is provided with a finger-key 53 which extends forward to the keyboard of the machine. The segmental guide 41 and the parts connected thereto are normally maintained in or restored to the normal position by a spring 54 (Fig. 2) connected at one end 55 to an apertured stud which depends from the top plate 16 and at its opposite end 56 it is connected to the segmental guide.

Each of the type carriers or single arm type bars 57 supported at the front of the supporting segment 58 is pivoted at 59 to a hanger 60, whereas each of the type bars or carriers 57$^a$ supported at the rear of the segment 58 is pivoted at 59$^a$ to a hanger 60$^a$. The various type bars 57 are each pivoted at 61 to a push-link 62 that is constructed in the same manner as the draw links 19 shown in detail in Fig. 9. These push links are each connected at the lower end 63 to an actuating lever 64 which is shown in detail in Fig. 7 and comprises a forwardly extending arm 65 to which a link 62 is connected and a depending arm 66 which is preferably rounded at its end 67 and each of these actuating links 64 is provided with a hook-like supporting abutment 68. Each of the type bars 57$^a$ that are supported upon hangers at the rear of the segment is pivoted at 61$^a$ to a draw-link 62$^a$. The draw-links 62$^a$ are constructed in essentially the same manner as the links 62 and 19 and are each pivoted at its rear end 63$^a$ to an actuating lever 64$^a$, shown in detail in Fig. 6. Each actuating lever 64$^a$ is provided with a rearwardly extending arm 65$^a$ and a depending arm 66$^a$ that is preferably provided with a rounded end 67$^a$ and a hook-like supporting abutment 68$^a$. In the normal positions of the parts the arms 66 and 66$^a$ of the various actuating levers 64 and 64$^a$ respectively are in alinement and correspond to the segmental arrangement of the actuating levers themselves.

From an inspection of Fig. 1 it will be observed that the arms 65 of one series of levers 64 project from the body portion thereof at one angle, whereas the corresponding arms on another series of said levers 64 project therefrom at a slightly different angle. The arms 65$^a$ of the levers 64$^a$ are arranged in a like manner and by this arrangement the links 62 and 62$^a$ between the said levers and type bars may be made of uniform size and construction irrespective of the staggered arrangement of the type bars and hangers and irrespective of the fact that one set of type bars and hangers is mounted on one side of the segment and another set of type bars and hangers is mounted on the opposite side of the segment. The manner of connecting the parts of the various actions likewise provides a substantially uniform leverage throughout the different actions notwithstanding the fact that the actuating levers 64 and 64$^a$ are mounted so as to project to opposite sides of the segment. It should be understood that type actions herein shown and described need not necessarily be employed in a machine wherein each key is adapted to be operatively connected to any one of a plurality of type bars and that a separate finger key may be employed to actuate each type bar.

The hook-like abutments 68 and 68$^a$ of the actuating levers just clear the segmental support 69 which is slitted at 70 for the reception of said links and is grooved for the reception of a single segmental pivot wire 71 which constitutes the pivot for all of the actuating levers. The arrangement of the parts is such that when the various actuating levers are positioned in their slots 70, they will be supported by the hook-like abutments thereof on the segmental support 69 and the apertures 72 in the levers will be in substantial alinement one with another and with the bearing of the pivot wire 71, so that the pivot wire may be inserted in the apertures or openings 72 of the various actuating levers while they are supported by their hooks. When the pivot wire 71 is forced to a position to connect the various actuating levers to their bearing, the effect will be to slightly raise each actuating lever in order that the hook-like supporting abutment thereof will clear the segmental support 69. By this construction it will be understood that means are provided for readily assembling the various actuating levers in the machine and when the pivot wire is withdrawn any desired actuating lever may be removed and repaired or replaced by another lever without disturbing any of the other levers.

Upon reference to Fig. 2 it will be seen that the free ends of the various hangers 60 and 60ª have a staggered arrangement and preferably overlap at their free ends. This close and compact mounting of the hangers and their associated parts is rendered possible by the disposition of the hangers upon opposite sides of the segmental support 58 without decreasing the thickness of the hangers to a material extent and thus detracting from the strength thereof. A further feature which enables the provision of the requisite number of type bars (say 84) within the segment, is the disposition of the arms 65 and 65ª of the actuating levers upon opposite sides of the segmental support 58, as well as the links 62 and 62ª which connect the actuating levers to the type bars. Another feature which enters into and enables this close arrangement of the type bars without interference is the construction and disposition of the type bars themselves as shown in Fig. 10, from which it will be seen that the type bars project to different distances at their forward ends and that certain of the type bars are bent laterally to form recesses 73 therein so that the types 74 on an adjacent bar extend into said recesses and may have sufficient room without separating the bars themselves to provide for clearance. From an inspection of Fig. 10, it will likewise be observed that the type on the various bars overlap and that the type block on one bar cuts the plane of the body portion on an adjacent bar without, however, the type bars obstructing one another in the operation of the machine. In other words, the type block on each bar overlaps or cuts a longitudinal radial plane in which the body, or a portion of the body, of an adjacent type bar is situated, or in which it moves during the printing operation. Thus the type or type block 74 on the bar $b$ overlaps or cuts the plane in which the part 73 of the body of the adjacent type bar $c$ moves. The first or lowermost type bar $d$ in Fig. 10 corresponds to the type bar bearing a like designation in Fig. 1. The remaining bars $a, b, c,$ in Fig. 10 are designated by like reference letters in Fig. 1. The arrangement of the group of four bars shown in Figs. 1 and 10 is duplicated throughout the machine.

In the normal position of the parts for lower case printing, the shoulder or abutment 39 (Fig. 8) on each connector coacts with an end 67 of an arm 66 on an actuating link 65, and a depression of a key lever 3 will cause the associated actuating slide 29 to be moved forward, thus transmitting movement to the actuating lever 64 and to the type bar operatively connected thereto. When upper case characters are to be written, the finger key 53 is depressed, thus raising the rod 49 and causing the segmental guide 41 to be moved on its links against the tension of its spring 54. The effect of this movement of the guide 41 is to move all of the connectors 37 around their pivots 36 from the position shown in Fig. 8 to a point where the abutment 39 of each connector will be in a position to coöperate with the depending arm 66ª of the next adjacent actuating lever 64ª. At this time a depression of a finger key will cause a slide 29 to be moved forward and the associated connector 37 will actuate the lever 64ª with which it coöperates, thus transmitting movement to the connected type bar which is provided with an upper case type. It will thus be seen that each key lever is adapted to actuate either one of two type bars, one having a lower case type and the other an upper case type; the type bar operated depending upon the position of the segmental guide 41. When a type bar has been moved to the printing point the laterally extending projection 35 of the associated slide will coöperate with the depending arm of the associated actuating lever, whether it be an arm 66 or an arm 66ª to restore the actuating lever and the type bar to the normal position.

From the foregoing description, it will be understood that the various elements of each type action may be readily connected to or separated from one another, which facilitates the assembling of the machine or the dismounting of any of the individual parts of the type actions.

What I claim as new and desire to secure by Letters Patent, is:—

1. In a front strike typewriting machine, the combination of a platen, segmentally arranged upwardly and rearwardly striking type carriers pivoted to fixed supports, key levers, intermediate actuating means between said key levers and type carriers, said means comprising substantially horizontally disposed segmentally arranged slides, and means for operatively connecting any slide with any one of a plurality of said type carriers.

2. In a typewriting machine, the combination of type carriers, key levers, actuating slides operatively connected to said key levers, a connector connected to each slide to receive a lateral movement relatively thereto and adapted to coöperate with any one of a plurality of said type carriers to actuate it, and means for moving said connectors.

3. In a typewriting machine, the combination of type carriers, actuating levers operatively connected thereto, key levers, actuating slides operatively connected to said key levers, a connector movably connected to each slide and adapted to coöperate with any one of a plurality of said actuating levers, and means for simultaneously moving all of said connectors.

4. In a front strike typewriting machine, the combination of type carriers, actuating slides, guides for guiding the slides in their movements, means movably connected to each slide for operatively connecting it to any one of a plurality of type carriers, key actuated means for moving the connecting means of each slide into operative connection with a type carrier, key levers, and operative connections between the key levers and said slides to actuate the type carriers connected therewith.

5. In a front strike typewriting machine, the combination of type carriers, longitudinally movable actuating slides, a fixed guide for guiding the slides in their longitudinal movement, means pivoted to each slide for operatively connecting it to any one of a plurality of type carriers, a movable guide for guiding the pivoted connecting means of the slides, key actuated means for moving the movable guide, key levers, and operative connections between the key levers and said slides to actuate the type carriers connected therewith.

6. In a front strike typewriting machine, the combination of segmentally arranged type carriers, segmentally arranged actuating levers operatively connected thereto, key levers, segmentally arranged actuating slides operatively connected to said key levers, segmentally arranged connectors, one pivoted to each slide and adapted to coöperate with any one of a plurality of said actuating levers, and means for simultaneously moving all of said connectors.

7. In a front strike typewriting machine, the combination of type carriers, actuating levers positively connected thereto, pivoted sliding connectors, each of which is adapted to be operatively connected to any one of a plurality of said actuating levers, means for moving said connectors laterally to effect a disengagement thereof from one set of said actuating levers and to effect an operative engagement with another set of said actuating levers, and independent key actuated means for moving each of said connectors in the direction of its length to effect a movement of the connected type carriers.

8. In a typewriting machine, the combination of a segment, type carriers supported upon opposite sides of said segment, key actuated means connected to said type carriers upon opposite sides of the segment, and means for operatively connecting a single key with any one of a plurality of the carriers.

9. In a typewriting machine, the combination of a segment, type carriers mounted upon opposite sides of said segment, actuating levers connected to said type carriers upon opposite sides of the segment, and key actuated means adapted to be operatively connected to any one of a plurality of said levers.

10. In a typewriting machine, the combination of a segment, type carriers supported upon opposite sides of said segment, actuating levers connected to said type carriers upon opposite sides of the segment, finger keys, connectors one for each of said keys and each connector being adapted to be operatively connected to any one of a plurality of said actuating levers and to move the connected type carrier to the printing position.

11. In a typewriting machine, the combination of type bars, key levers therefor, horizontally disposed slides, a horizontally disposed connector pivoted to each slide, means carried by each connector for operatively connecting it with any one of a plurality of said type bars, a movable guide which coöperates with all of said connectors to move them on their pivotal centers independently of the slides, and key actuated means for moving said guide.

12. In a typewriting machine, the combination of segmentally arranged type bars, horizontally disposed segmentally arranged slides, horizontally disposed segmentally arranged connectors, one of which is pivoted to each slide, a key lever for each slide, means carried by each connector for operatively connecting it with any one of a plurality of said type bars, a segmental aperture movable guide which coöperates with all of said connectors to move them on their pivotal centers independently of the slides, and key actuated means for moving said guide to disengage each connector from operative connection with one type bar and to operatively connect it with another.

13. In a typewriting machine, the combination of key levers, links connected thereto, bell-crank levers connected to said links, actuating slides connected to said bell crank levers, actuating levers, a plurality of which are adapted to be operatively connected to each of said slides, type bars, and links connecting said type bars and actuating levers.

14. In a typewriting machine, the combination of key levers, links connected thereto, bell crank levers connected to said dlinks, horizontally disposed segmentally arranged actuating slides connected to said bell crank levers, segmentally arranged actuating levers, a plurality of which are adapted to be operatively connected to each of said slides, segmentally arranged type bars, and segmentally arranged links connecting said type bars and actuating levers.

15. In a typewriting machine, the combination of a segment, type carriers supported upon opposite sides of said segment, actuating links which connect with said type carriers upon opposite sides of the segment, actuating levers which connect with said links upon opposite sides of the segment, and key actuated slides which coöperate with and are operatively connected to said levers.

16. In a typewriting machine, the combination of a segment, type carriers supported upon opposite sides of said segment, actuating links which connect with said type carriers upon opposite sides of the segment, actuating levers which connect with said links upon opposite sides of the segment, slides which coöperate with and are operatively connected to said levers, bell crank levers which are connected to said slides, and keys operatively connected to said bell crank levers.

17. In a typewriting machine, the combination of a segment, segmentally arranged type carriers supported upon opposite sides of said segment, segmentally arranged actuating links which connect with said type carriers upon opposite sides of the segment, actuating levers which connect with said links upon opposite sides of the segment, slides which coöperate with and are operatively connected to said levers, bell crank levers which are connected to said slides, links connected to said bell crank levers and finger keys connected to said last mentioned links.

18. In a typewriting machine, the combination of a segment, segmentally arranged type carriers supported upon opposite sides of said segment, segmentally arranged actuating links which connect with said type carriers upon opposite sides of said segment and which have alined arms, slides which are operatively connected to alined arms of the levers, finger keys, and operative connections between the finger keys and slides.

19. In a typewriting machine, the combination of a system of single arm type bars, finger keys therefor, and means controlled by the finger keys for actuating the type bars, the type bars extending at their free ends to different distances and arranged throughout the system so that the type block on one bar when at rest will overlap or cut the plane in which the body or a portion of the body of an adjacent type bar moves.

20. In a typewriting machine, the combination of a system of type bars, finger keys therefor, and means controlled by the finger keys for actuating the type bars, the said type bars being bent laterally to form recesses in which the type blocks of adjacent type bars pass.

21. In a typewriting machine, the combination of a system of type bars, finger keys therefor, and means controlled by the finger keys for actuating the type bars, the type bars being bent laterally to form recesses in the sides thereof and extending at their free ends to different distances, so that type blocks on the bars extend into recesses in adjacent type bars.

22. In a typewriting machine, the combination of a slotted bearing, a member pivotally supported therein, and means independent of or apart from said slotted bearing to support said member independently of its pivot and in a position where the pivot may be readily inserted and unite said member with its slotted bearing.

23. In a typewriting machine, the combination of type carriers, key levers, and pivoted actuating levers which are operatively connected to said type carriers and key levers, each of said actuating levers having a pivotal support and an auxiliary supporting abutment which is adapted to support the levers independently of their pivot.

24. In a typewriting machine, the combination of type carriers, key levers, and pivoted actuating levers which are operatively connected to said type carriers and key levers, each of said actuating levers having a pivotal support and an auxiliary supporting abutment which is adapted to support the levers independently of their pivot and so that the pivotal bearings therein are in substantial alinement one with another.

25. In a typewriting machine, the combination of type carriers, key levers, and pivoted actuating levers which are operatively connected to said type carriers and key levers, each of said actuating levers having a pivotal support and an auxiliary supporting abutment which is adapted to support the levers independently of their pivot and so that the pivotal bearings therein are in substantial alinement one with another and with the pivot of said levers.

26. In a typewriting machine, the combination of a support having a pivot bearing therein, a pivot rod or wire in said bearing and a series of actuating levers seated on said pivot rod, each of said levers having an abutment projecting therefrom which is adapted to rest upon the support when the pivot rod is withdrawn and to maintain the levers properly supported and positioned for the insertion of the pivot rod in the pivotal bearings therein.

27. In a typewriting machine, the combination of a segmental radially slitted support having a pivot bearing therein, a pivot rod or wire in said bearing; and a series of actuating levers seated in the slits in the support and on said pivot rod, each of said levers having a hook-like abutment projecting therefrom which is adapted to rest upon the support when the pivot rod is withdrawn and to maintain the levers properly supported and positioned for the insertion of the pivot rod in the pivotal bearings therein.

28. In a typewriting machine, the combination of a series of segmentally arranged type bars, a series of segmentally arranged levers, one for each of said type bars, a series of key levers, a series of slides operatively connected to said key levers, a series of segmentally arranged connectors one for each slide, and means for simultaneously connecting all of said connectors with one set or another of said segmentally arranged levers.

29. In a typewriting machine, the combination of a series of segmentally arranged type bars, a series of segmentally arranged levers operatively connected to said type bars, a series of segmentally arranged slides, a series of bell cranks one connected to each of said slides, a series of key levers one connected to each of said bell cranks, a series of connectors, and shifting means for operatively uniting the connectors to one set or another of said segmentally arranged levers.

30. In a typewriting machine, the combination of a series of type bars, a series of key actuated pivoted levers therefor, and means independent of their pivot or pivots and bearings for supporting said levers in a pivot receiving position.

31. In a typewriting machine, the combination of a series of type bars, a series of key actuated pivoted levers therefor, and means independent of their pivot or pivots and bearings for supporting said levers and which is clear of the levers when they are pivoted in place.

32. In a typewriting machine, the combination of a series of type bars, a series of pivoted actuating levers therefor, key levers operatively connected to said actuating levers, and means independent of the pivot or pivots of said levers and their bearings for supporting the levers in place and which is clear of the levers when they are pivoted in the machine.

33. In a typewriting machine, the combination of a series of type bars, a series of key levers, a series of pivoted actuating levers interposed between the key levers and the type bars and operatively connected thereto, and means apart from the pivots and bearings for supporting said actuating levers in position to be pivoted in place.

34. In a typewriting machine, the combination of a series of type bars, a series of pivoted key actuated levers therefor, each provided with a pivotal opening therein, and auxiliary means for supporting each said lever in place to receive its pivot.

35. In a typewriting machine, the combination of a series of type bars, a series of pivoted key actuated levers therefor, each provided with a pivotal opening therein, a slotted support for said levers, the walls of the slots being provided with pivot holes, a pivot rod or wire, and auxiliary means for supporting said levers in position so that the pivotal openings therein are maintained in alinement to receive the pivot rod or wire therefor.

36. In a typewriting machine, the combination of key levers, type bars, type bar actuating devices operatively connected to said type bars and key levers and having pivot holes, a slotted and perforated support for said actuating devices, a longitudinally movable pivot or fulcrum rod, and an auxiliary support which coöperates with said type bar devices to support them in place when the fulcrum rod is withdrawn.

37. In a typewriting machine, the combination of a series of type bars, a series of pivoted actuating devices therefor, a slotted and perforated support for said actuating devices, and an auxiliary support for supporting the type bar actuating devices in place in the machine when they are disconnected from their pivots.

38. In a type action, the combination of an actuating member, a slotted and perforated support therefor, a removable pivot for connecting said actuating member to said slotted and perforated support, and an auxiliary support for supporting said member in position to receive the pivot therefor.

39. In a typewriting machine, the combination of a series of type bars, a series of key levers, a series of pivoted actuating levers operatively connecting the key levers with the type bars, a pivot or fulcrum rod for said actuating levers, and auxiliary supporting means for holding up the actuating levers when the pivot or fulcrum rod is withdrawn therefrom.

Signed at the borough of Manhattan, city of New York, in the county of New York, and State of New York, this 21st day of August, A. D. 1903.

GEORGE B. WEBB.

Witnesses:
K. V. DONOVAN,
E. M. WELLS.